July 28, 1953  D. A. FOUTES  2,646,586

SELF-PROPELLED AUTOMOBILE WASHING MACHINE

Filed Aug. 3, 1951  4 Sheets-Sheet 1

INVENTOR
DAVID A. FOUTES

ATTORNEY

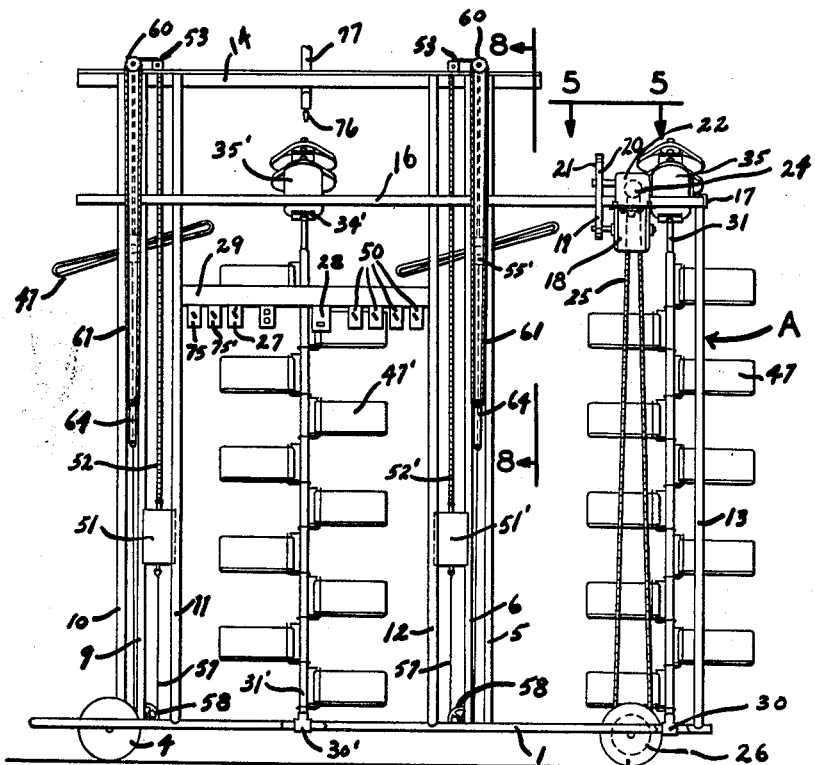

July 28, 1953  D. A. FOUTES  2,646,586
SELF-PROPELLED AUTOMOBILE WASHING MACHINE
Filed Aug. 3, 1951  4 Sheets-Sheet 3

INVENTOR
DAVID A. FOUTES
BY
ATTORNEY

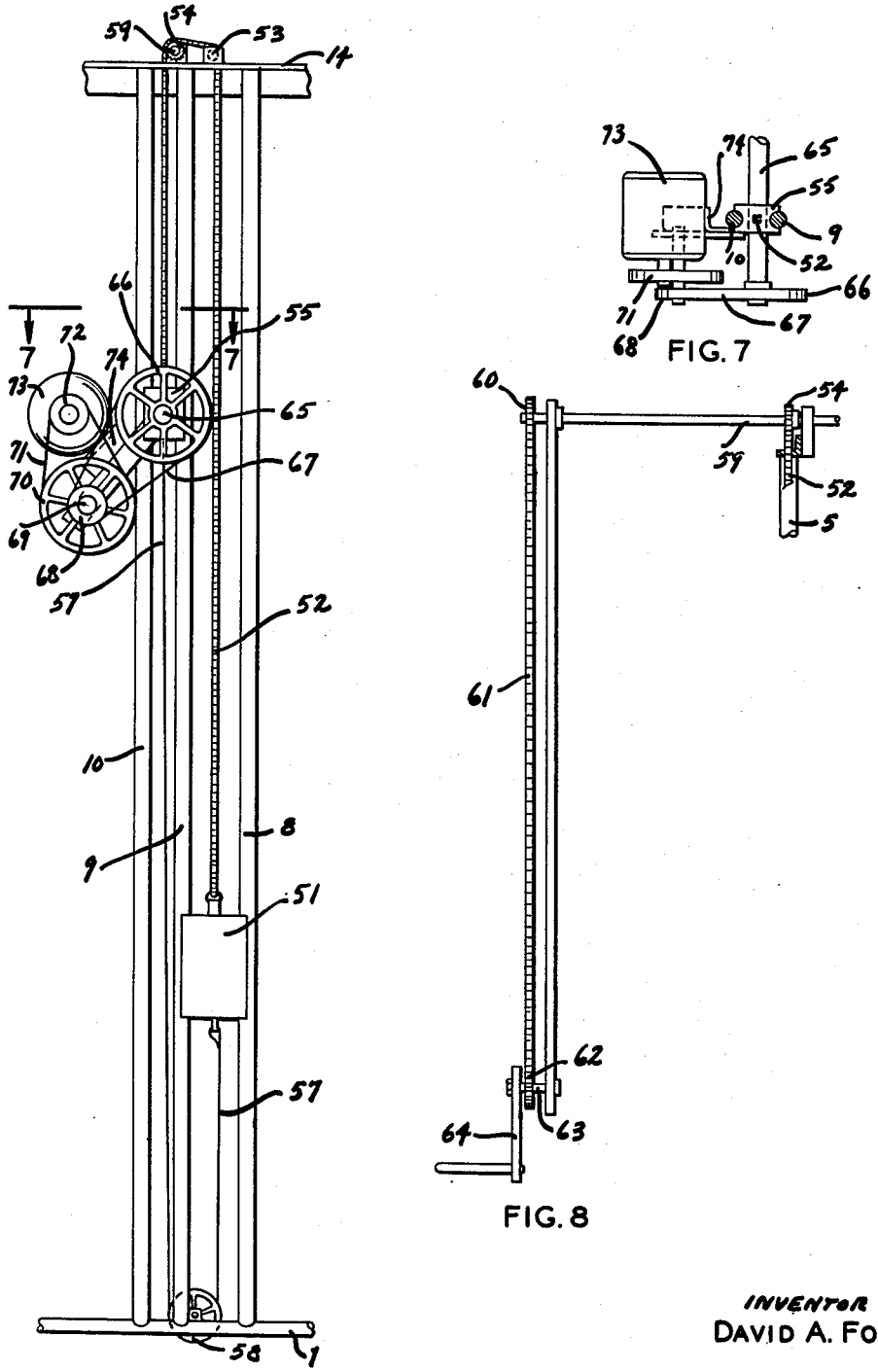

Patented July 28, 1953

2,646,586

UNITED STATES PATENT OFFICE 2,646,586

SELF-PROPELLED AUTOMOBILE WASHING MACHINE

David A. Foutes, Hannibal, Mo.

Application August 3, 1951, Serial No. 240,083

3 Claims. (Cl. 15—97)

1

This invention relates in general to certain new and useful improvements in self-propelled automobile washing machines and, more particularly, to a compact self-contained car washing machine adapted for washing passenger automobiles and the like.

At the present time the washing of automobiles is usually accomplished by placing the car on a so-called wash rack and carrying out the washing operation by hand with hoses and sponges. In recent years one or two types of semi-automatic car washing machines have been developed but these machines involve extremely expensive complicated installations and involve a conveyor belt arrangement by which the automobile is propelled through a tunnel-like sequence of spraying and scrubbing mechanisms and finally through a long section in which the automobile is exposed to blasts of heated air. This type of mechanical installation is capable of washing an automobile in a matter of a few minutes but it is by no means economical in terms of labor or materials since it requires the use of very costly specially constructed brushes and necessitates the attendance of a large staff of workmen who wipe off the car, the windshield and glass, and perform a number of finishing operations. It has been estimated that such mechanical installations are much more costly in terms of man-hours of labor than even the older and more conventional method of hand-washing on a wash-rack. Furthermore, these mechanical installations require excessive amounts of building space which adds to the cost of the installation itself.

It is the primary object of the present invention, therefore, to provide a compact car washing machine which is relatively inexpensive in construction costs and maintenance and which can be set up and operated within a comparatively small building or building-space.

It is a further object of the present invention to provide a car washing machine of the type stated which moves to-and-fro along the car being washed while the car remains stationary and which can be manipulated and operated from a single compact set of controls capable of being handled by a single individual.

It is also an object of the present invention to provide a car washing machine of the type stated which is so simple in operation and compact in construction that it can readily be operated by handicapped persons, such as war veterans who are so-called "wheelchair" cases and are deprived of the use of their lower extremities.

2

It is an additional object of the present invention to provide a car washing machine of the type stated which is so economical in initial investment, maintenance, and operating cost, as to be readily suitable for use in small garages, filling stations, and the like, where a modest volume of business can be achieved and very large investment, operating, and maintenance costs cannot be economically justified.

With the above and other objects in view, my invention resides in the novel features of form, construction, arrangement, and combination of parts presently described and pointed out in the claims.

In the accompanying drawings—

Figure 2 is an elevational view of one side of the car washing machine;

Figure 4 is a fragmentary sectional view taken along line 4—4 of Figure 1;

Figure 5 is a fragmentary sectional view taken along line 5—5 of Figure 2;

Figure 6 is a fragmentary vertical sectional view taken along line 6—6 of Figure 1;

Figure 7 is a fragmentary horizontal sectional view taken along line 7—7 of Figure 6;

Figure 8 is a fragmentary vertical sectional view taken along line 8—8 of Figure 2;

Broadly speaking the present invention comprises a skeleton-like rectilinear frame constructed of tubular steel structural members in the general shape of an inverted U so as to extend around the two sides and across the top of an ordinary automobile. The frame is mounted upon wheels or casters and is self-propelled so that it will pass slowly along and over the vehicle from front to rear or rear to front, as the case may be. Operatively mounted within the framework are a series of vertically inclined and horizontal shafts which are motor driven and carry unique scrubbing and polishing cloths for cleansing the vehicle under a water spray also carried by the framework and ultimately for polishing the water droplets away so as to leave the vehicle shiny and clean. The vertically inclined shafts are capable of being swung inwardly and outwardly to various angles of adjustment within prescribed limits to accommodate various degrees of angularity in the side contours of different vehicles and, similarly, the horizontal or top-cleaning shafts are vertically shiftable to accommodate various levels of the different horizontal or nearly horizontal surfaces of the automobile.

Figure 1:
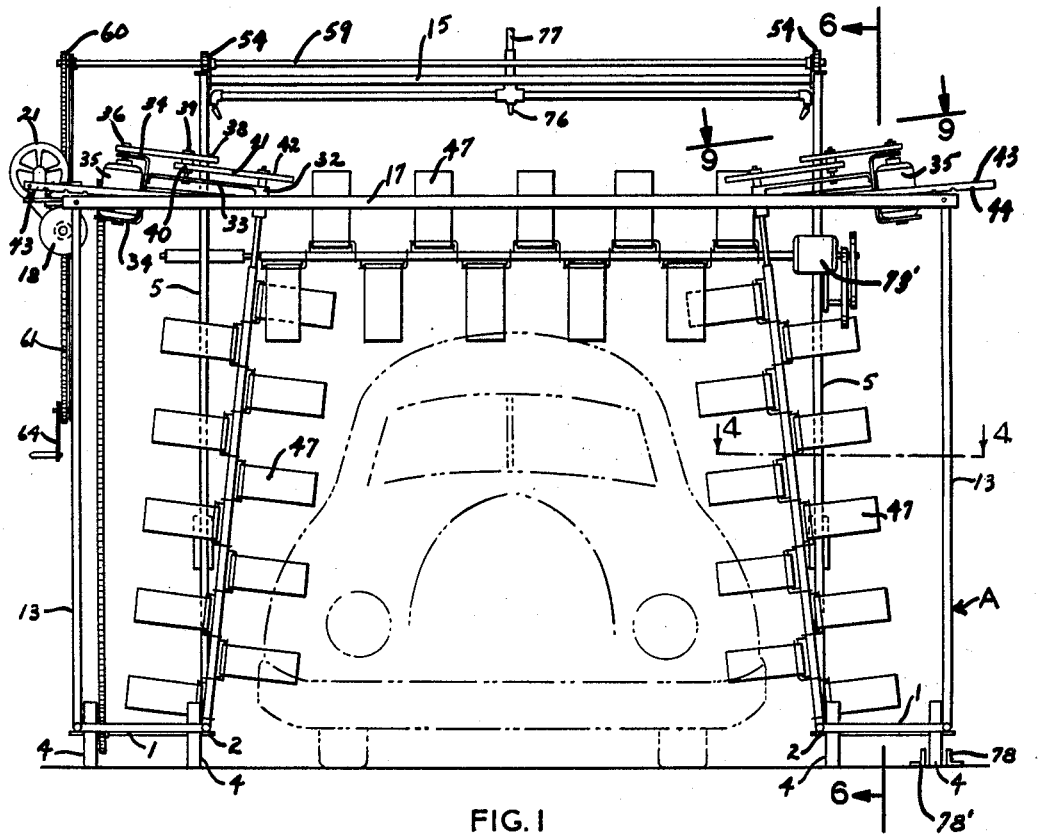
Figure 1 is an end elevational view of a car washing machine constructed in accordance with and embodying the present invention.
Figure 9:
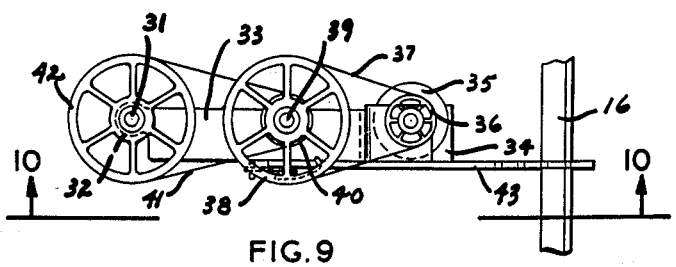
Figure 9 is a fragmentary sectional view taken along line 9—9 of Figure 1.

Referring now in more detail and by reference characters to the drawings, which illustrate a preferred embodiment of the present invention, A designates a car washing machine comprising two laterally spaced horizontal, U-shaped base frames 1 provided with forward shafts 2 and rearward shafts 3, each having floor-engaging wheels 4. Welded to each of the base frames 1 and projecting vertically upwardly therefrom are tubular uprights 5, 6, 7, 8, 9, 10, 11, 12, and 13. The uprights 5, 6, 7, 8, 9, and 10 of each of the base frames 1 extend upwardly for a substantial distance above the upper ends of the uprights 11, 12, and 13, and are longitudinally connected at their upper ends by an angle member 14. These same uprights are also transversely connected across the top by transverse struts 15. The upper ends of the uprights 11, 12, and 13, are lengthwise connected by an angle member 16 and finally the uprights 13 of the two base frames 1 are transversely connected by an angle member 17. The joints between all of these various uprights and cross members are preferably welded so as to form a very strong secure skeletonized framework which will fit over and around an automobile or similar vehicle in the manner of an inverted U and may be moved along the floor to-and-fro over and around such vehicle, substantially as shown in Figure 1.

Rigidly mounted upon the member 16 is a conventional electric motor 18 having a drive pulley 19 connected by a V-belt 20 to a pulley 21 of a conventional speed reducing mechanism 22 which, in turn, includes an output shaft 23 and drive sprocket 24 around which is trained a conventional roller chain 25, the latter being, in turn, also trained around a sprocket 26 pinned to the forward shaft 2. The motor 18 is conventionally connected by suitable wires (not shown) to a switch 27 and speed controller 28 forming part of a control bar 29. In this connection it should be pointed out that the particular arrangement of the various instruments and switches on this control bar is not critical but may be varied as circumstances require, the type of arrangement shown in Figure 2 being illustrative rather than definitive.

Figure 10:
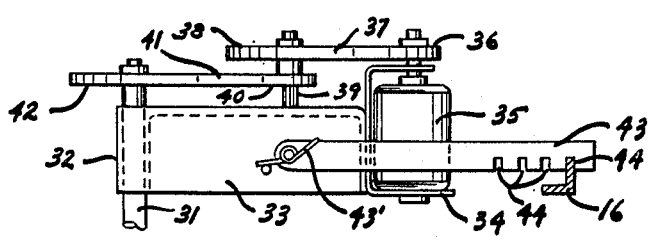
Figure 10 is a fragmentary sectional view taken along line 10—10 of Figure 9.
Figure 3:
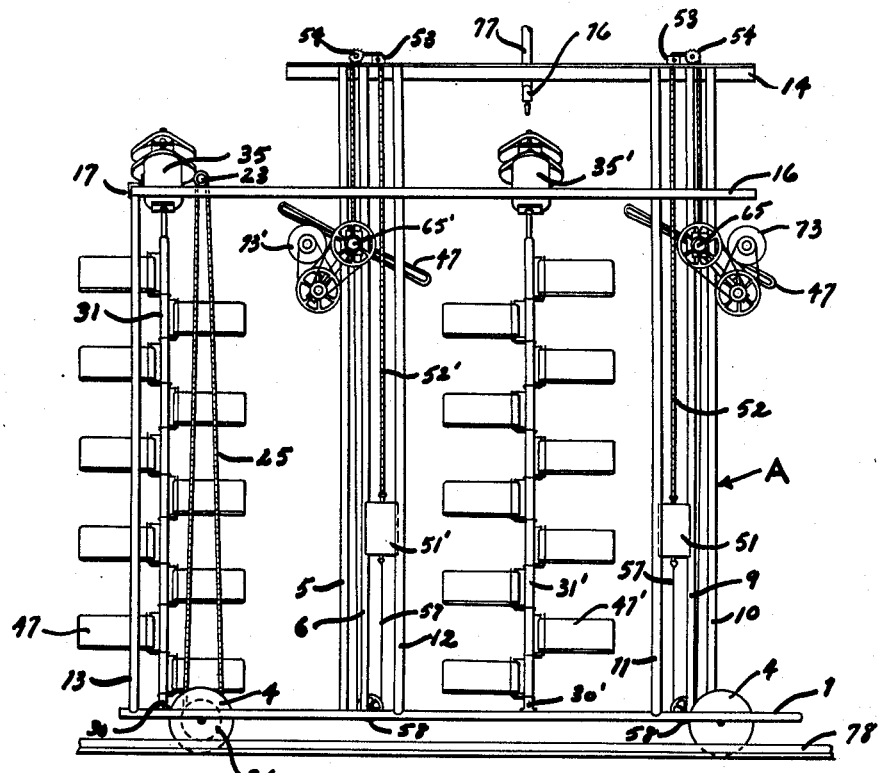
Figure 3 is an elevational view of the other side of the car washing machine.

Rockably mounted upon the inside leg of each of the base frames 1, adjacent the forward ends thereof, are foot bearings 30 in which are rotatably mounted upwardly extending inclined shafts 31, journaled at their upper ends in bearing sleeves 32, integrally formed on the ends of frame plates 33, which are, in turn, at their outer ends welded to a U-shaped motor carriage 34 in which is mounted an electric motor 35. The motor 35 is provided with a drive pulley 36 connected by a V-belt 37 to an intermediate pulley 38 and counter-shaft 39 and thence through a second intermediate pulley 40 and drive belt 41 to a driving pulley 42 pinned to the upper end of the shaft 31. Pivotally mounted at its inner end upon the frame plate 33 for limited vertical swinging movement is an outwardly extending latch bar 43 provided along its under edge with a series of spaced slots 44 for optional engagement with the upstanding edge of the structural member 16. By adjusting the latch bar 43 to any one of its optional positions the motor frame 34 and the associated frame plate 33, together with the entire assembly thereon supported, can be shifted inwardly and outwardly within prescribed limits so that the vertical angularity of the shaft 31 may be varied. The latch bar 43 is biased downwardly by a hair pin spring 43', as best seen in Figure 10.

At uniformly spaced intervals and alternately on opposite sides the shafts 31 are provided with wiper securement assemblies comprising a radially projecting pin 45 and an L-shaped arm 46, the upper end of the L-shaped arm being spaced slightly downwardly from the pin 45 so as to provide a very narrow gap or space therebetween to permit threading a continuous loop-shaped wiper 47 thereon. Welded, pinned, or otherwise securely attached to the shafts 31 in the region of the horizontal leg of the L-shaped arm 46 is a U-shaped retainer bracket 48 projecting radially outwardly for a substantial distance beyond the vertical leg of the arm 46 and at its outer extremities being provided with upwardly extending spaced parallel arms 49, which lie loosely on opposite sides of the wipers 47. Thus, it will be seen that the wipers 47 may be readily changed or replaced whenever circumstances may require.

The inner horizontal legs of the base frames 1 are also provided with foot bearings 30' and shafts 31' constructed substantially in the same manner as the foot bearings 30 and shafts 31, previously described, and similarly powered by an electric motor 35' also mounted in a transversely shiftable frame 34' and provided with a spaced series of wipers 47'. It will be understood that there are four vertically positioned angularly adjustable shafts having wiper elements and driven by electric motors and the electric motors are all individually controlled by separate switches 50 mounted on the instrument bar 29.

Operatively mounted for vertically shifting movement between each pair of vertical uprights 8, 9, is a counterweight 51 connected on its upper end to a sprocket chain 52 which extends upwardly between the uprights 8, 9, and is turned over an idle roller 53 and thence around a sprocket 54 and extends downwardly for connection at its lower end to a slide block 55 which is, in turn, mounted for vertically shifting movement between the uprights 9, 10. The slide block 55 is, furthermore, attached on its under face to a downwardly extending flexible cable 57 which, in turn, is trained around an idler pulley 58, journaled upon the base frame 1 and the cable 57 extends thence upwardly and is operatively attached to the under side of the counterweight 51, all as best seen in Figure 6.

The sprocket 54 is operatively mounted upon an idler shaft 59 which is suitably journaled upon the structural member 14 and extends transversely outwardly, being provided on its outward end with a driving sprocket 60 which is, in turn, engaged with a sprocket chain 61 trained at its lower end around a second sprocket 62, pinned to a shaft 63, operatively journaled on the upright member 11 and provided at its outer end with a crank handle 64, as shown in Figure 8.

The two slide blocks 55 on opposite sides of the car washing machine A are provided with axially aligned journals for rotatably supporting a cross-shaft 65. The shaft 65 projects outwardly from one of the slide blocks 55 and on such projecting end is rigidly provided with a pulley 66 connected by a V-belt 67 to an intermediate pulley 68 and countershaft 69 which is, in turn, provided with an auxiliary pulley 70 connected by a V-belt 71 to the driving pulley 72 of an electric motor 73. The electric motor 73 is rigidly mounted upon a motor-supporting bracket 74 which is welded to and carried by the slide block 55.

Figures 11, 12:
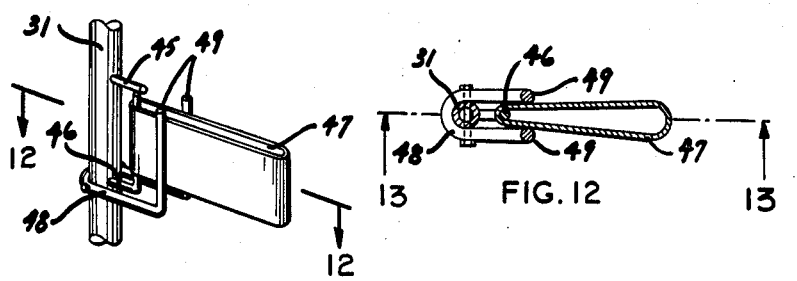
Figure 11 is an enlarged perspective view showing the details of construction of the wiper securement elements forming a part of the present invention.
Figure 12 is a fragmentary sectional view taken along line 12—12 of Figure 11.
Figure 13:
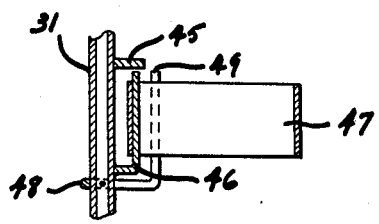
Figure 13 is a fragmentary sectional view taken along line 13—13 of Figure 12.

The cross-shaft 65 is provided with a plurality of alternately arranged and oppositely presented wiper securement elements identical with the wiper securement elements 45, 46, previously described and shown in Figures 11 to 13, inclusive, and accordingly is equipped with a series of wipers 47.

Slidably mounted between the pairs of vertical uprights 6, 7, are counterweights 51', substantially identical in all respects to the previously described counterweights 51, and similarly connected by sprocket chains 52' and associated mechanisms to vertical shiftable slide blocks 55' which, in turn, operatively support a cross-shaft 65', substantially identical in all respects to the previously described cross-shaft 65, and similarly driven by an electric motor 73', substantially identical with the previously described motor 73. The motors 73, 73', are connected conventionally by electric wires to control switches 75, 75', mounted on the control bar 29.

Carried by and extending horizontally between the structural members 14 is a spray pipe 76 connected conventionally by a suitable length of rubber hose 77 to a source of water under pressure (not shown).

In use and operation, an automobile is driven onto the selected working space of the garage or filling station floor and the windows and other air vents closed in the usual manner preparatory to being washed. Preferably, though not necessarily, this working space is laid out and defined by a pair of simple angle iron tract members 78, 78', in which one forward wheel 4 and the corresponding rearwardly aligned wheel 4 may ride. Thereupon, the main driving motor 18 is turned on and the forward speed of the car washing machine A is adjusted by appropriate manipulation of the speed controller 28 so that the machine A will progress slowly downwardly and approach the front bumper of the vehicle. As soon as the machine begins to approach the front bumper the water is turned on through the hose 77 and spray 76 and, at the same time, the motors 35 are set in operation so that the wipers 47' will begin to rotate at a sufficient speed that the centrifugal force will tend to hold the wipers 47' in substantially straight radial position, in which position they will slap against the sidewardly presented surfaces of the vehicle being washed. The speed of rotation of these wipers 47' is fully sufficient to slap the car-surfaces with a gentle force which will, in no way, scratch or mar the finish thereon.

As the car washing machine A begins to move over the front bumper and approach the radiator grill of the car being washed, the horizontal shafts 65, 65', are set in motion and, by appropriate manipulation of the crank handle 64, are lowered into operative engagement with the horizontally presented surfaces of the automobile, such as the top of the hood and the top of the body compartment. The angular positions of the shafts 31, 31', are, of course, adjusted before the car washing operation actually starts so as to accommodate the particular vehicle upon which the car washing operation is to be carried out. As is well known some particular automobiles are constructed with an exaggerated angle of slope upwardly and inwardly along the side surfaces thereof from the fender skirts toward the top, requiring an exaggerated degree of angularity in the position of the shafts 31, 31'. Other automobiles are more or less straight-sided and in such cases the shafts 31, 31', are adjusted to a more nearly vertical position. The adjustment in the vertical angularity of the shafts 31, 31', once set, will not be varied during the particular car washing operation for which the setting or adjustment was made. In fact, it is not necessary to change this adjustment frequently, since most types of automobiles have more or less conventional contours.

On the other hand, the horizontal position of the shafts 65, 65', will be continuously varied up and down to follow the horizontal profile of the automobile being washed as the car washing machine A moves along.

It will, of course, be understood that the wipers 47, 47', may be very quickly and conveniently removed and changed from time to time when replacement is needed as a result of wear or when different textures and types of wipers may be required. For example, it is possible by using soft fuzzy types of wiper elements made of pile fabrics or sheepskin to utilize the car washing machine A as a car polishing machine. This can be accomplished by first washing the car as above described and then substituting polishing elements for the wipers 47, 47', and running the machine A over the car a second time. Prior to this second run, of course, the car may be sprayed with a water emulsified solution of car wax and the solution allowed to dry. Thereupon, the polishing operation will be automatically completed by the machine A to produce a brilliant and long-lasting lustrous finish upon the surfaces of the automobile.

It should be understood that changes and modifications in the form, construction, arrangement, and combination of the several parts of the car washing machine may be made and substituted for those herein shown and described without departing from the nature and principle of my invention.

Having thus described my invention, what I claim and desire to secure by Letters Patent is:

1. A car washing machine comprising a frame having a generally tunnel-shaped configuration adapted to fit over and around an automobile, wheels operatively mounted on the frame, a prime mover operatively mounted in and carried by the frame, said prime mover being operatively connected to at least some of said wheels for moving the frame slowly along the automobile, a plurality of approximately vertical shafts mounted for swingable movement toward and away from the automobile, said shafts being provided with radially projecting hooks, and a loop of absorbent wiping material removably mounted on each hook.

2. A car washing machine comprising a frame having a generally tunnel-shaped configuration adapted to fit over and around an automobile, wheels operatively mounted on the frame, a prime mover operatively mounted in and carried by the frame, said prime mover being operatively connected to at least some of said wheels for moving the frame slowly along the automobile, a plurality of approximately vertical shafts mounted for swingable movement toward and away from the automobile, said shafts being provided with radially projecting hooks, a radial pin set into the shafts above each hook and in upwardly spaced relation thereto, and a loop of absorbent wiping material removably mounted on each hook.

3. A car washing machine comprising a frame having a generally tunnel-shaped configuration adapted to fit over and around an automobile, wheels operatively mounted on the frame, a prime mover operatively mounted in and carried by the frame, said prime mover being operatively connected to at least some of said wheels for moving the frame slowly along the automobile, a plurality of approximately vertical shafts mounted for swingable movement toward and away from the automobile, said shafts being provided with radially projecting hooks, each of said shafts further being provided with a pair of parallel rods associated with each hook, the rods of each such pair being located respectively on opposite sides of, and radially outwardly from, the hook with which they are associated, and a loop of absorbent wiping material removably mounted on each hook and extending outwardly between the rods associated with such hook.

DAVID A. FOUTES.

References Cited in the file of this patent

UNITED STATES PATENTS

| Number | Name | Date |
|---|---|---|
| 1,908,788 | Pulliam | May 16, 1933 |
| 2,253,609 | Byron et al. | Aug. 26, 1941 |
| 2,257,255 | Yingling | Sept. 30, 1941 |
| 2,329,377 | Imes | Sept. 14, 1943 |
| 2,544,066 | Chenault | Mar. 6, 1951 |
| 2,579,866 | Rosseau | Dec. 25, 1951 |
| 2,583,703 | Morison | Jan. 29, 1952 |